(12) United States Patent
Mahaffy

(10) Patent No.: US 12,240,603 B1
(45) Date of Patent: Mar. 4, 2025

(54) OBLIQUE ALL-WING VEHICLE

(71) Applicant: EXQUADRUM, INC., Adelanto, CA (US)

(72) Inventor: Kevin E. Mahaffy, Oak Hills, CA (US)

(73) Assignee: EXQUADRUM, INC., Adelanto, CA (US)

( * ) Notice: Subject to any disclaimer, the term of this patent is extended or adjusted under 35 U.S.C. 154(b) by 0 days.

(21) Appl. No.: 18/158,261

(22) Filed: Jan. 23, 2023

(51) Int. Cl.
    *B64C 39/10* (2006.01)
    *B64D 1/02* (2006.01)
    *B64D 27/02* (2006.01)
    *B64D 37/04* (2006.01)

(52) U.S. Cl.
    CPC ............... *B64C 39/10* (2013.01); *B64D 1/02* (2013.01); *B64D 27/023* (2013.01); *B64D 37/04* (2013.01)

(58) Field of Classification Search
    CPC ........ B64C 39/10; B64D 1/02; B64D 27/023; B64D 37/04
    See application file for complete search history.

(56) References Cited

U.S. PATENT DOCUMENTS

| | | | | |
|---|---|---|---|---|
| 4,836,470 A * | 6/1989 | Criswell | ................. | B64C 39/10 244/159.3 |
| 6,926,226 B2 * | 8/2005 | Gathier | ................... | B64D 5/00 244/2 |
| 8,678,321 B2 * | 3/2014 | Bezos | .................... | B64G 1/623 244/158.9 |
| 10,994,842 B1 * | 5/2021 | Skylus | ..................... | B64D 5/00 |
| 11,912,441 B2 * | 2/2024 | Argemi Samso | ...... | B64G 1/002 |
| 2002/0040951 A1 * | 4/2002 | Janeke | ...................... | F02K 9/90 244/171.1 |
| 2011/0198434 A1 * | 8/2011 | Ustinov | ................... | B64D 5/00 244/2 |
| 2019/0003423 A1 * | 1/2019 | Pelfrey | ..................... | F02K 9/62 |
| 2019/0382098 A1 * | 12/2019 | McDonnell | ............... | B64C 3/10 |
| 2022/0299299 A1 * | 9/2022 | Buesing | ................ | B64C 9/00 |
| 2022/0341594 A1 * | 10/2022 | Herrmann | ................ | F02K 9/95 |

OTHER PUBLICATIONS

Van Der Velden et al., "The Aerodynamic Design Of The Oblique Flying Wing Supersonic Transport"; 8 pgs.; Jun. 1990.
Images of aerial vehicles known by Applicant as of Jan. 23, 2023.

* cited by examiner

*Primary Examiner* — Tien Q Dinh
*Assistant Examiner* — Katherine June Walter
(74) *Attorney, Agent, or Firm* — Merchant & Gould P.C.

(57) ABSTRACT

An oblique all-wing (OAW) vehicle and methods are described where the OAW vehicle has a unique configuration and can be used to, for example, launch a payload. The OAW vehicle can include an elongated airfoil body with a longitudinal axis, a top surface, a bottom surface, a first longitudinal end, a second longitudinal end, a first longitudinal edge at a first juncture between the top surface and the bottom surface, and a second longitudinal edge at a second juncture between the top surface and the bottom surface. The elongated airfoil body has an airfoil-shaped cross-section, with the first longitudinal edge defining a leading edge and the second longitudinal edge defining a trailing edge. A rocket engine or other propulsion device is mounted to the elongated airfoil body at the first longitudinal end.

3 Claims, 16 Drawing Sheets

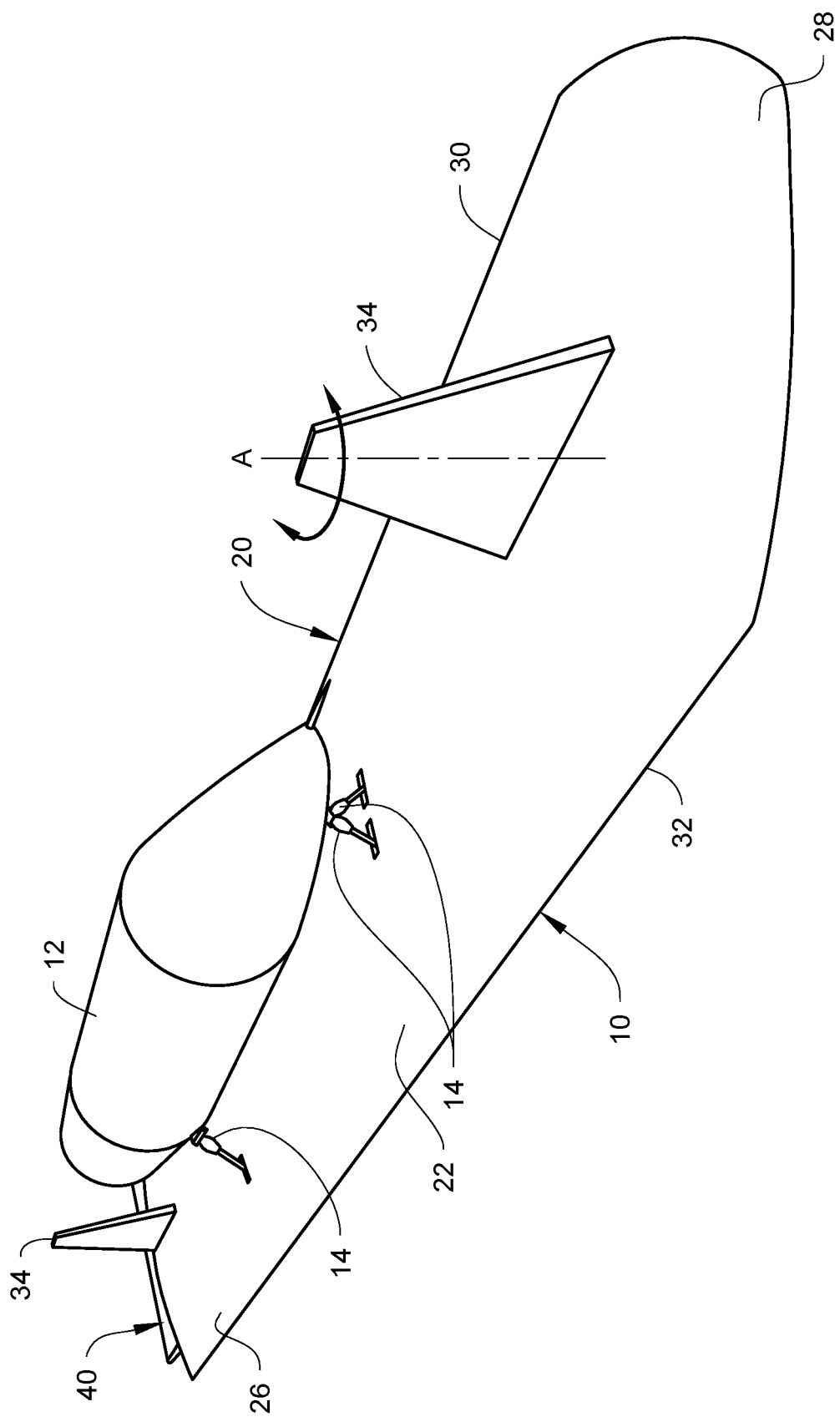

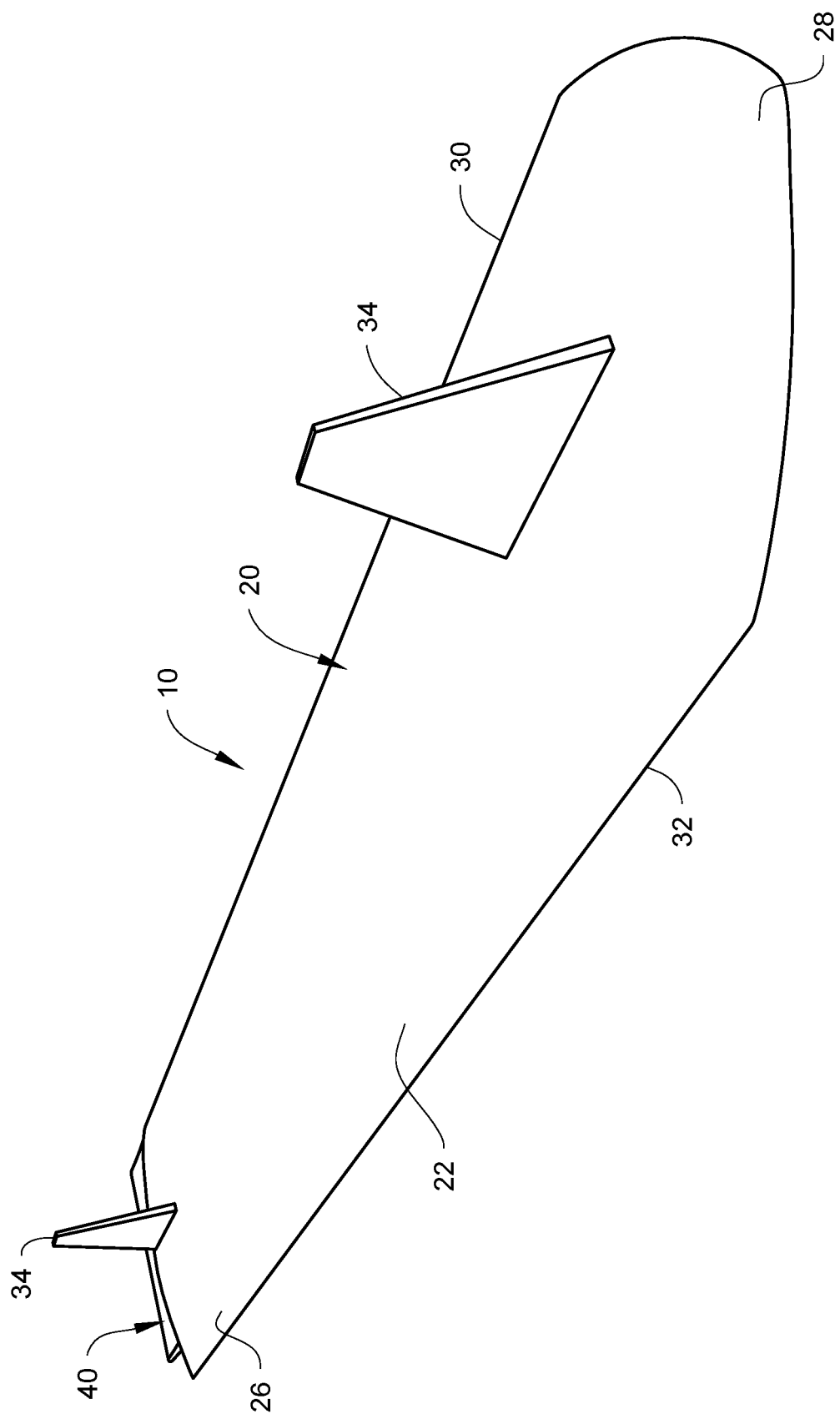

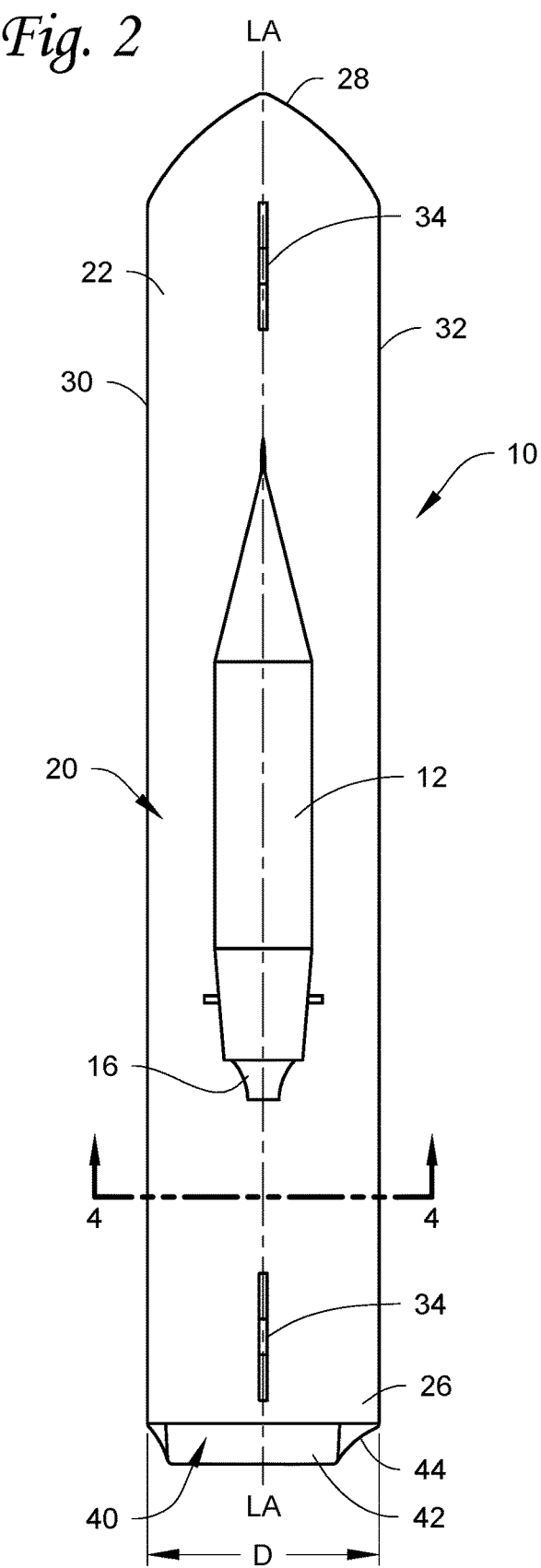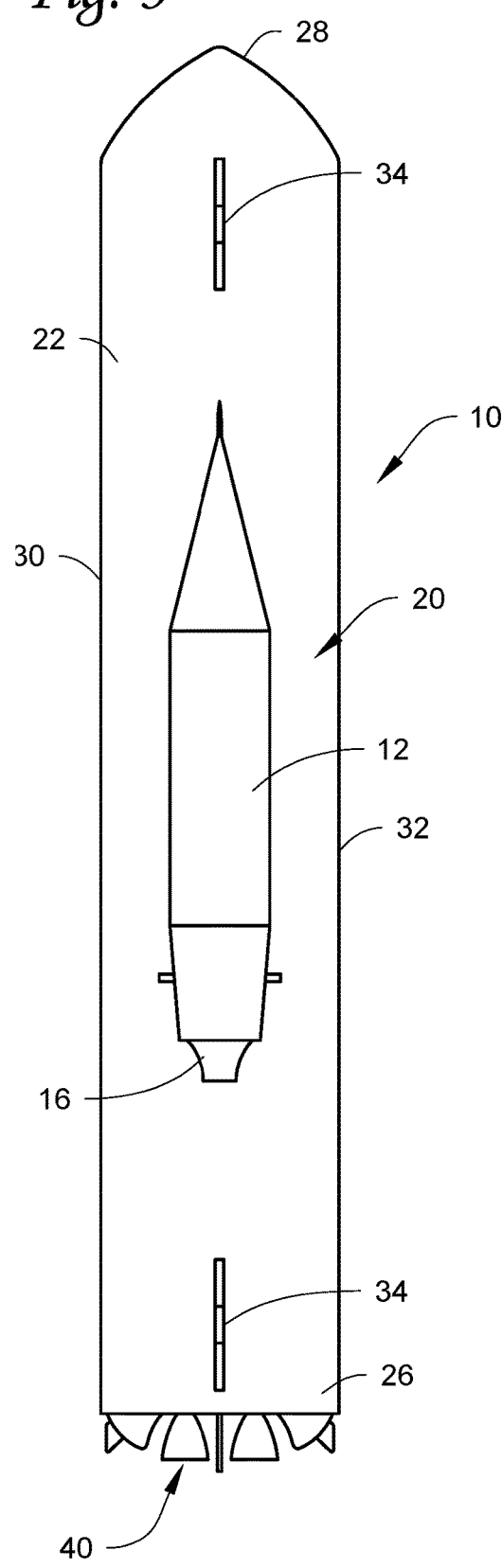

Fig. 8
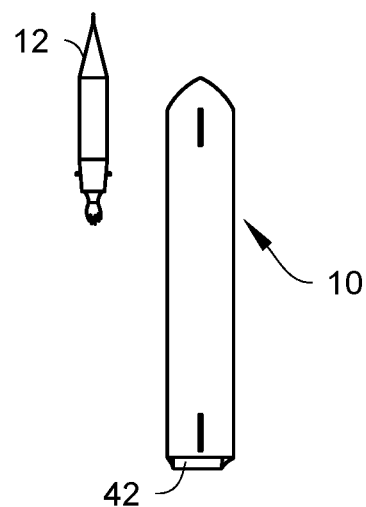
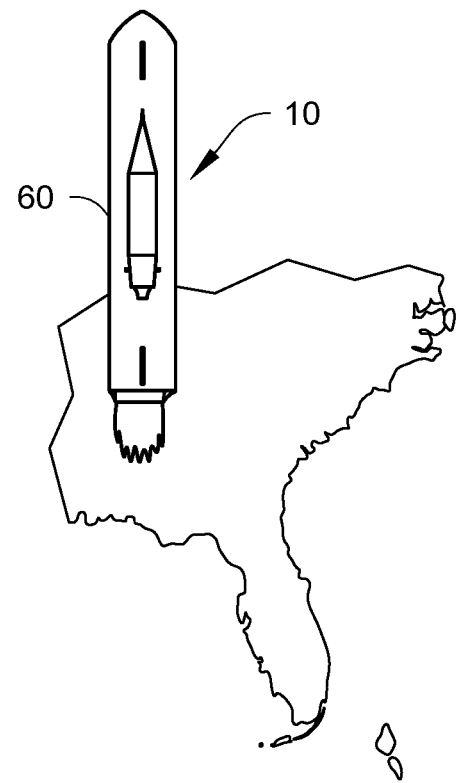

OBLIQUE ALL-WING VEHICLE

FIELD

This technical disclosure describes an oblique all-wing (OAW) vehicle that, in one embodiment, can be used as a payload launch vehicle (in which case the OAW vehicle can be referred to as an OAW payload launch vehicle) to launch a payload.

BACKGROUND

The concept of an OAW vehicle is known. An OAW vehicle is made up of a wing without a conventional fuselage that can take off with the span of the wing perpendicular to the relative wind to achieve maximum low airspeed lift. As the OAW vehicle accelerates to higher Mach numbers it moves into an oblique orientation such that the longitudinal axis (i.e. span) of the wing is at an angle relative to its flight path. This gives the OAW vehicle the advantage of flying with a swept wing that can adjust for maximum performance across a wide range of flight conditions. The OAW vehicle can also land while in the oblique orientation.

SUMMARY

An OAW vehicle and methods are described where the OAW vehicle has a unique configuration and can be used in unique ways, for example to launch a payload. In one embodiment, the OAW vehicle can have a rocket engine mounted at one end thereof, and the OAW vehicle can be launched vertically like a rocket.

In one embodiment, an OAW vehicle can include an elongated airfoil body having a longitudinal axis or span, a top surface, a bottom surface, a first longitudinal end, a second longitudinal end, a first longitudinal edge at a first juncture between the top surface and the bottom surface that extends from the first longitudinal end to the second longitudinal end, and a second longitudinal edge at a second juncture between the top surface and the bottom surface that extends from the first longitudinal end to the second longitudinal end. In addition, the elongated airfoil body can have an airfoil-shaped cross-section, with the first longitudinal edge defining a leading edge of the elongated airfoil body and the second longitudinal edge defining a trailing edge of the elongated airfoil body. In some embodiments, the elongated airfoil body may have the airfoil-shaped cross-section over the entire length between the first longitudinal end and the second longitudinal end.

A rocket engine can be mounted to the elongated airfoil body at the first longitudinal end, for example within the elongated airfoil body. The rocket engine provides propulsion for the OAW vehicle. Fuel for the rocket engine can be provided by at least one fuel tank within the elongated airfoil body. The fuel tank can be arranged longitudinally with a longitudinal axis thereof parallel to the longitudinal axis of the elongated airfoil body. In one embodiment, at least one liquid fuel tank and at least one liquid oxidizer tank can be provided within the elongated airfoil body.

If used to launch a payload, the payload can be releasably mounted on the exterior of the OAW vehicle, or releasably mounted within the OAW vehicle. In one embodiment, the payload can be releasably mounted on the top surface of the OAW vehicle. The payload may also have a longitudinal axis that is parallel to the longitudinal axis of the elongated airfoil body.

To launch the OAW vehicle, the OAW vehicle may be arranged into a vertical orientation with a longitudinal axis thereof arranged vertically, and the rocket engine can then be ignited to launch the OAW vehicle while in the vertical orientation.

The OAW vehicle described herein can be used to put a payload into orbit, deliver a weapon anywhere in the world, and/or deliver a cargo package anywhere in the world.

DRAWINGS

FIG. 1A illustrates an example of an OAW vehicle described herein with a payload mounted on the OAW vehicle.

FIG. 1B illustrates another embodiment of an OAW vehicle described herein without a payload.

FIG. 2 is a top view of the OAW vehicle in FIG. 1 with a first type of rocket engine for propulsion of the OAW vehicle.

FIG. 3 is a top view of another embodiment of an OAW vehicle with a second type of rocket engine for propulsion of the OAW vehicle.

FIG. 8 is a schematic depiction of a portion of the flight path of the OAW vehicle from launch, release of the payload, and beginning of descent.

DETAILED DESCRIPTION

Figure 19A:
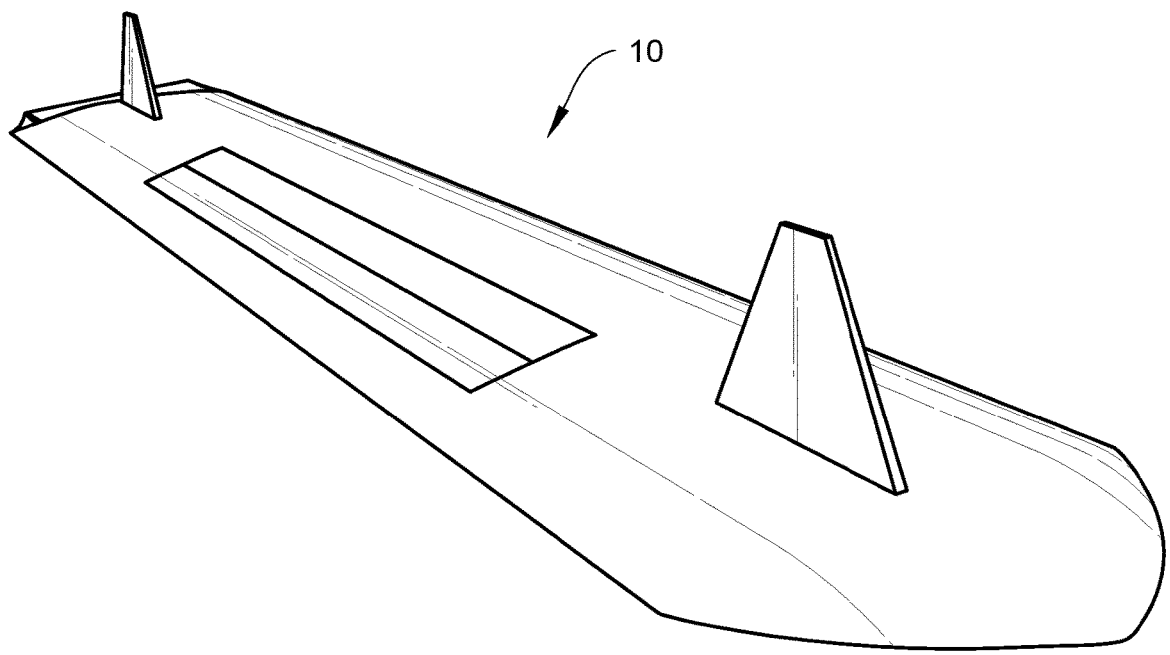
FIGS. 19A and 19B are perspective views of the OAW vehicle with an interior payload and doors that can open and close.
Figure 19B:
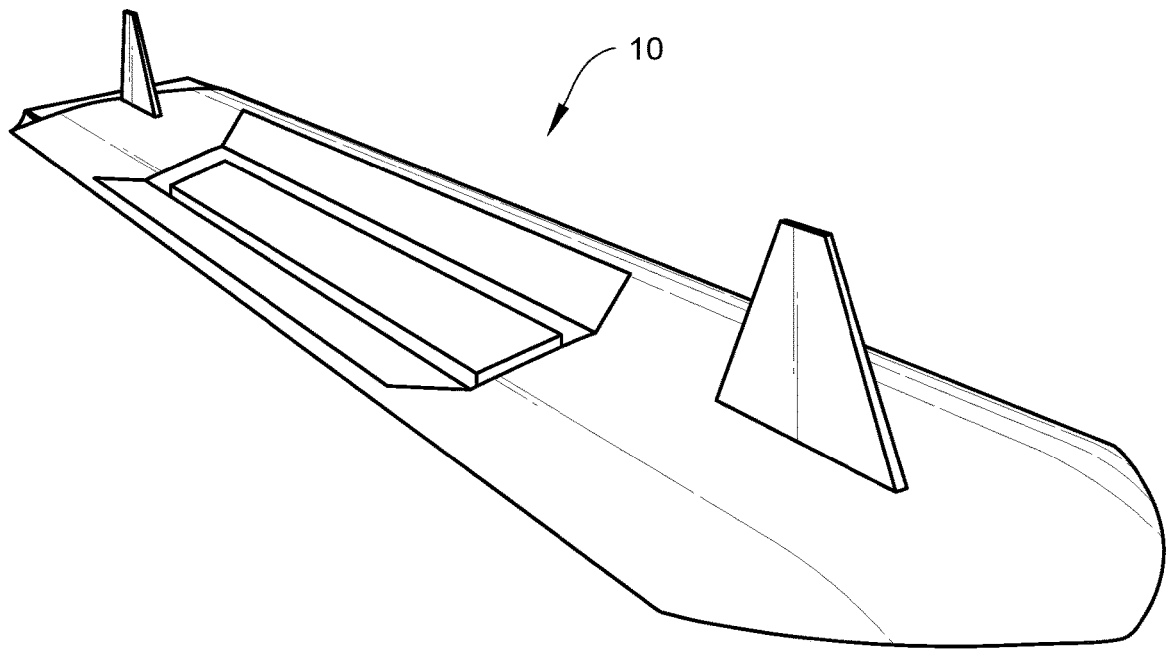

FIG. 1A illustrates an example of OAW vehicle 10 that is used as a payload launch vehicle to launch a payload 12. In this example, the payload 12 is illustrated as being releasably mounted on the exterior of the OAW vehicle 10 by one or more payload supports 14, and the payload 12 is intended to be released from the OAW vehicle 10 when a desired staging condition has been achieved. The staging condition can be one or more of a desired speed of the OAW vehicle 10, and/or an altitude of the OAW vehicle 10, and/or a coordinate position of the OAW vehicle 10 such as geographic coordinates, Earth-centered inertial coordinates or Earth-center, Earth-fixed coordinates. In some embodiments, referring to FIGS. 19A and 19B, the payload 12 can be mounted within an interior 13 of the OAW vehicle 10, and one or more payload doors 15 on the OAW vehicle 10 can be opened to permit release of the payload 12 from the interior 13. FIG. 19A depicts the OAW vehicle 10 with a pair of the payload doors 15 with the payload doors 15 closed, and the payload (not visible) within the interior of the OAW vehicle 10. In an embodiment, a single payload door 15 can be used instead of a pair of the payload doors 15. FIG. 19B depicts the payload doors 15 open showing the payload 12 within the interior 13 ready to be deployed from the OAW vehicle 10. After releasing the payload 12, the payload doors 15 can be closed, and the OAW vehicle 10 can be controlled to glide back to a landing site which can be at or near the launch site, or remote from the launch site.

The payload 12 can be any type of payload that can be launched using the OAW vehicle 10. The payload 12 may have its own propulsion system or the payload 12 may be devoid of propulsion. For example, the payload 12 may comprise a propulsion rocket 16 (best seen in FIGS. 2 and 3) for propulsion. The propulsion rocket 16 may be ignited after release of the payload 12 from the OAW vehicle 10 whereby the payload 12 can be controlled to continue on a desired flight trajectory. The payload 12 may include one or more control surfaces (not shown), such as adjustable fins, to assist in controlling the trajectory of the payload 12 after release.

As best seen in FIGS. 2-3, the payload 12 can be mounted on the OAW vehicle 10 so that a longitudinal axis of the payload 12 is parallel to a longitudinal axis LA of the OAW vehicle 10. However, the payload 12 can have other orientations on the elongated airfoil body 20, and the payload 12 may not even have a longitudinal axis.

The presence of the payload 12 is optional. For example, FIG. 1B illustrates another embodiment of the OAW vehicle 10 without the payload 12 or the payload supports 14. The OAW vehicles 10 in FIGS. 1A and 1B can be otherwise identical to one another.

Figure 4:
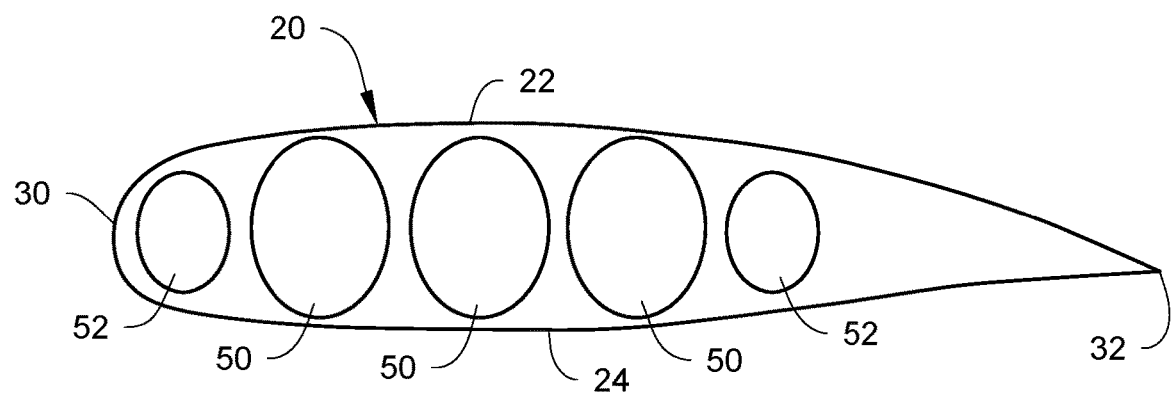
FIG. 4 is a cross-sectional view taken along line 4-4 in FIG. 2 showing one embodiment of fuel tanks in the OAW vehicle.
Figure 5:
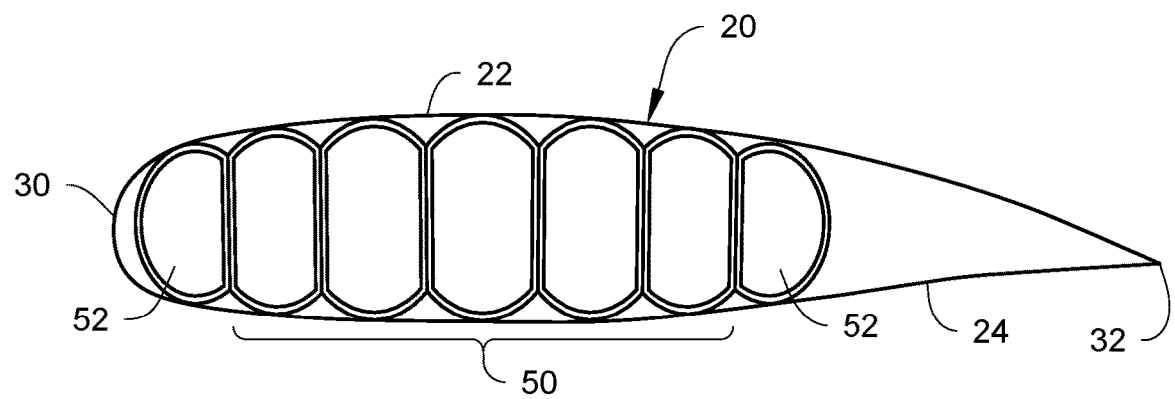
FIG. 5 is another cross-sectional view taken along line 4-4 in FIG. 2 showing another embodiment of fuel tanks in the OAW vehicle.

Referring to FIGS. 1-5, the OAW vehicle 10 comprises an elongated airfoil body 20 with an airfoil shaped cross-section (FIGS. 4 and 5). The airfoil body 20 has a top surface 22, a bottom surface 24, a first longitudinal end 26, a second longitudinal end 28, a first longitudinal edge 30 at a first juncture between the top surface 22 and the bottom surface 24 that extends from the first longitudinal end 26 to the second longitudinal end 28 and defines a leading edge of the elongated airfoil body 20, and a second longitudinal edge 32 at a second juncture between the top surface 22 and the bottom surface 24 that extends from the first longitudinal end 26 to the second longitudinal end 28 and defines a trailing edge of the elongated airfoil body 20. The elongated airfoil body can have an airfoil-shaped cross-section substantially over the entire length between the first longitudinal end 26 and the second longitudinal end 28 (in other words, any cross-section taken along a section line, such as section line 4-4 depicted in FIG. 2, at any point along the longitudinal axis LA would result in an airfoil shape, for example similar to the airfoil shape shown in FIG. 4 or FIG. 5). The elongated airfoil body 20 can be made of materials known in the aircraft/aerospace industry.

The elongated airfoil body 20 can be provided with one or more control surfaces or fins 34 for providing directional control during flight. FIGS. 1-3 illustrate the control surfaces 34 as being disposed on the top surface 22. However, the control surfaces 34 can alternatively be disposed on the bottom surface 24, or one or more control surfaces in addition to the control surfaces(s) 34 on the top surface 22 can be provided on the bottom surface 24. In some embodiments, control surfaces on the payload 12 can be used to help provide directional control of the OAW vehicle 10 while the payload 12 is mounted on the OAW vehicle 10. The payload 12 may be mounted along the center of the OAW vehicle 10 between the two control surfaces 34 for mass balance.

Each of the control surfaces 34 is preferably adjustable in order to adjust their orientation on the OAW vehicle 10. For example, with reference to FIGS. 1A and 6, each control surface 34 may be mounted on the OAW vehicle 10 in a manner to permit each control surface 34 to be adjustable about a vertical axis A by a suitable drive mechanism (not shown) within the elongated airfoil body 20.

To provide propulsion, a propulsion device 40 is mounted to the elongated airfoil body 20 at the first longitudinal end 26 as best seen in FIGS. 1-3. The propulsion device 40 can have any configuration that is suitable for providing propulsion to the OAW vehicle 10. For example, the propulsion device 40 can be a rocket engine that is powered by a liquid propellant, a solid rocket motor that is powered by a solid propellant, or a hybrid rocket motor that uses a solid propellant and a liquid and/or gaseous propellant (FIG. 3). The propulsion device 40 is preferably disposed substantially within the elongated airfoil body 20, with substantially only some or all of an exhaust nozzle extending from the elongated airfoil body 20. In other embodiments, the propulsion device 40 can be only partially disposed within the elongated airfoil body 20 with a majority of the propulsion device 40 located outside the elongated airfoil body 20. With reference to FIG. 2, in one embodiment the propulsion device 40 can comprise a full-length linear aerospike engine 42. The aerospike engine 42 can extend at least 75% of an entire distance between the leading edge 30 and the trailing edge 32. In another embodiment, the propulsion device 40 can comprise a truncated linear aerospike engine 42. An aerodynamic fairing 44 can be provided between the aerospike engine 42 and the OAW vehicle 10. A full length aerospike engine is useful in some embodiments because it makes an aerodynamically better nose as the OAW vehicle 10 re-enters the Earth's atmosphere and flies to a landing. A truncated aerospike engine may be used if the end/nose of the truncated aerospike engine is rounded or otherwise made more aerodynamic. The propulsion device 40 has a thrust axis that is preferably substantially parallel to the longitudinal axis LA, and in one embodiment, the thrust axis extends through the center of the elongated airfoil body 20 (i.e. midway between the leading edge 30 and the trailing edge 32 and extending in the span direction of the airfoil body 20).

Figure 6:
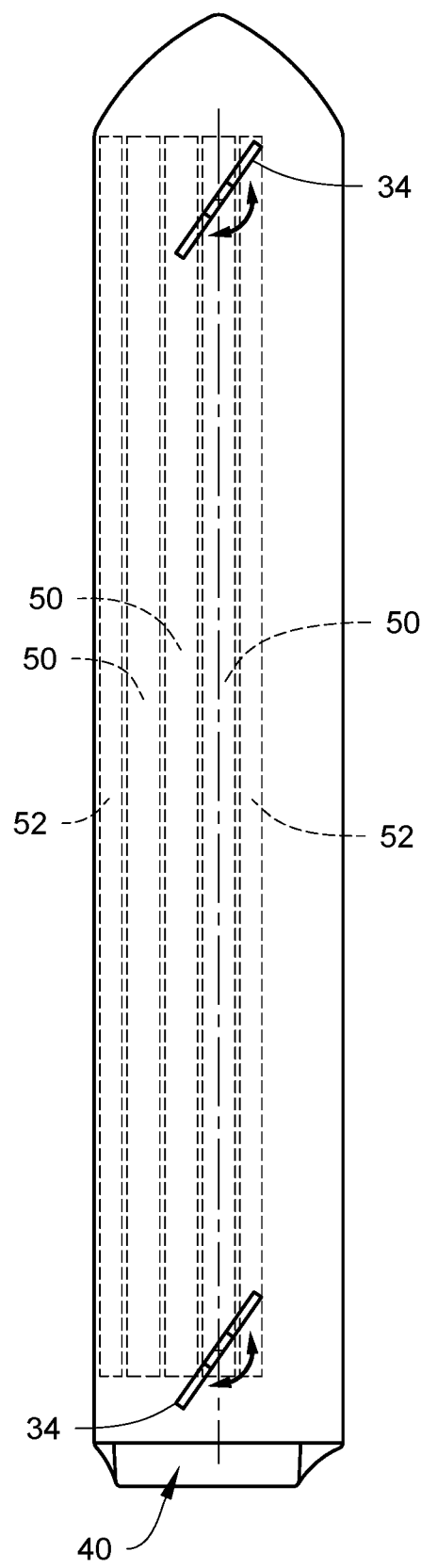
FIG. 6 is a top view of the OAW vehicle showing adjustment of the control surfaces and the internal fuel tanks shown in dashed lines.
Figure 7:
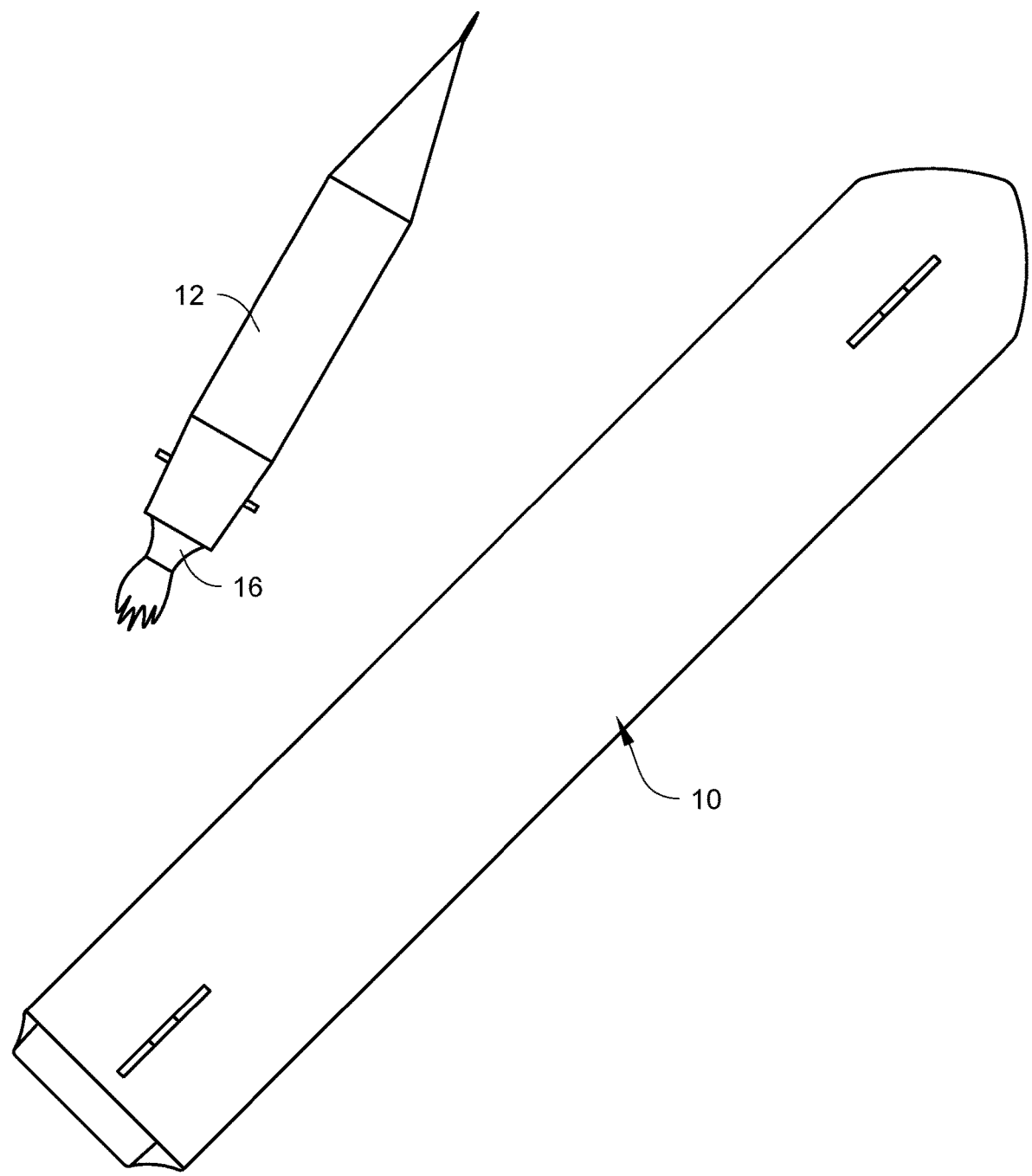
FIG. 7 illustrates release of the payload from the OAW vehicle.

The OAW vehicle 10 includes at least one fuel tank that provides fuel to the propulsion device 40. Preferably, the fuel tank is disposed entirely within the elongated airfoil body 20. Referring to FIG. 4, in one embodiment, the OAW vehicle 10 includes at least one liquid fuel tank 50, for example three liquid fuel tanks 50, and at least one liquid oxidizer tank 52, for example two liquid oxidizer tanks, within the elongated airfoil body 20. The tanks 50, 52 are fluidly connected to the propulsion device 40 in a conventional manner to supply fuel to the propulsion device 40. FIG. 5 illustrates another embodiment that includes at least one liquid fuel tank 50, for example five liquid fuel tanks, and at least one liquid oxidizer tank 52, for example two liquid oxidizer tanks, within the elongated airfoil body 20. In each of the embodiments in FIGS. 4 and 5, the liquid fuel tanks 50 and the liquid oxidizer tanks 52 are arranged and extend longitudinally within the elongated airfoil body 20 with longitudinal axes of the tanks 50, 52 parallel, or substantially parallel, to the longitudinal axis LA of the elongated airfoil body 20 as best seen in FIG. 6. The fuel and oxidizer (if used) can be any conventional fuel and oxidizer known in the art. A solid propellant can be provided if the propulsion device 40 is a hybrid rocket motor, a solid rocket motor, or a solid rocket motor augmented by a liquid monopropellant or oxidizer.

In an embodiment, the OAW vehicle 10 can be used as a Stage 1 for a launch vehicle. Referring to FIG. 8, operation of the OAW vehicle 10 as a Stage 1 will be described assuming the propulsion device 40 is an aerospike engine. The OAW vehicle 10 is prepared for launch by arranging the OAW vehicle 10 into a vertical orientation at a suitable launch site with the longitudinal axis LA arranged vertically as shown at 60. The rocket engine or other propulsion device is then ignited to launch the OAW vehicle 10 while it is in the vertical orientation. If the OAW vehicle 10 is to launch a payload, such as the payload 12 or upper stage, the payload is mounted onto the OAW vehicle 10 prior to launch, for example while the OAW vehicle 10 is in a horizontal orientation prior to the OAW vehicle 10 being arranged vertically for launch. The payload 12 can be mounted externally as depicted in FIG. 8 or internally of the OAW vehicle 10 as described with respect to FIGS. 19A-19B. The OAW vehicle 10 climbs to its staging altitude/velocity and then shuts down/terminates thrust. The payload/upper stage (s) then separate and flies to orbit. The OAW vehicle 10 then continues to climb due its momentum. The OAW vehicle 10 then reaches apogee. Once the OAW vehicle 10 hits apogee and begins falling towards Earth, the nozzle of the aerospike engine is already positioned to be the aerodynamic nose of the OAW vehicle 10.

Figure 11:
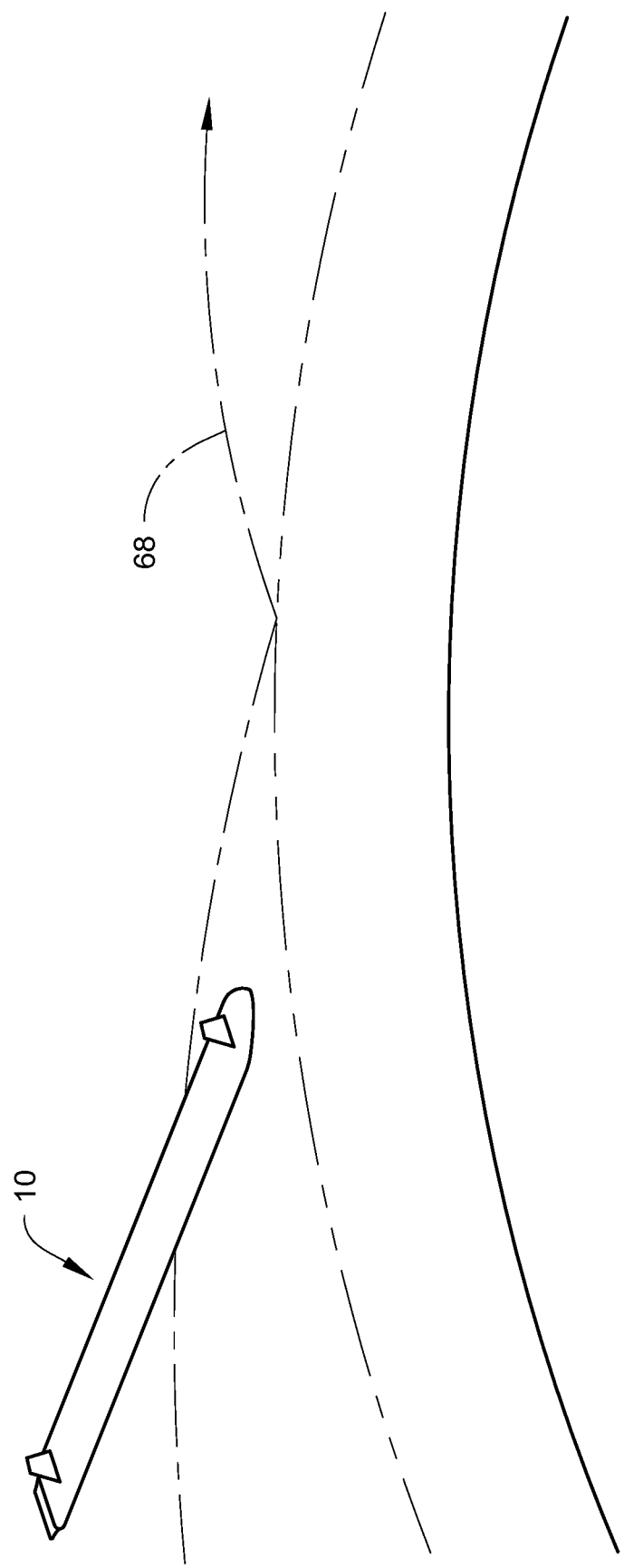
FIG. 11 is a schematic depiction of the OAW vehicle executing a skip-glide trajectory.
Figure 12:
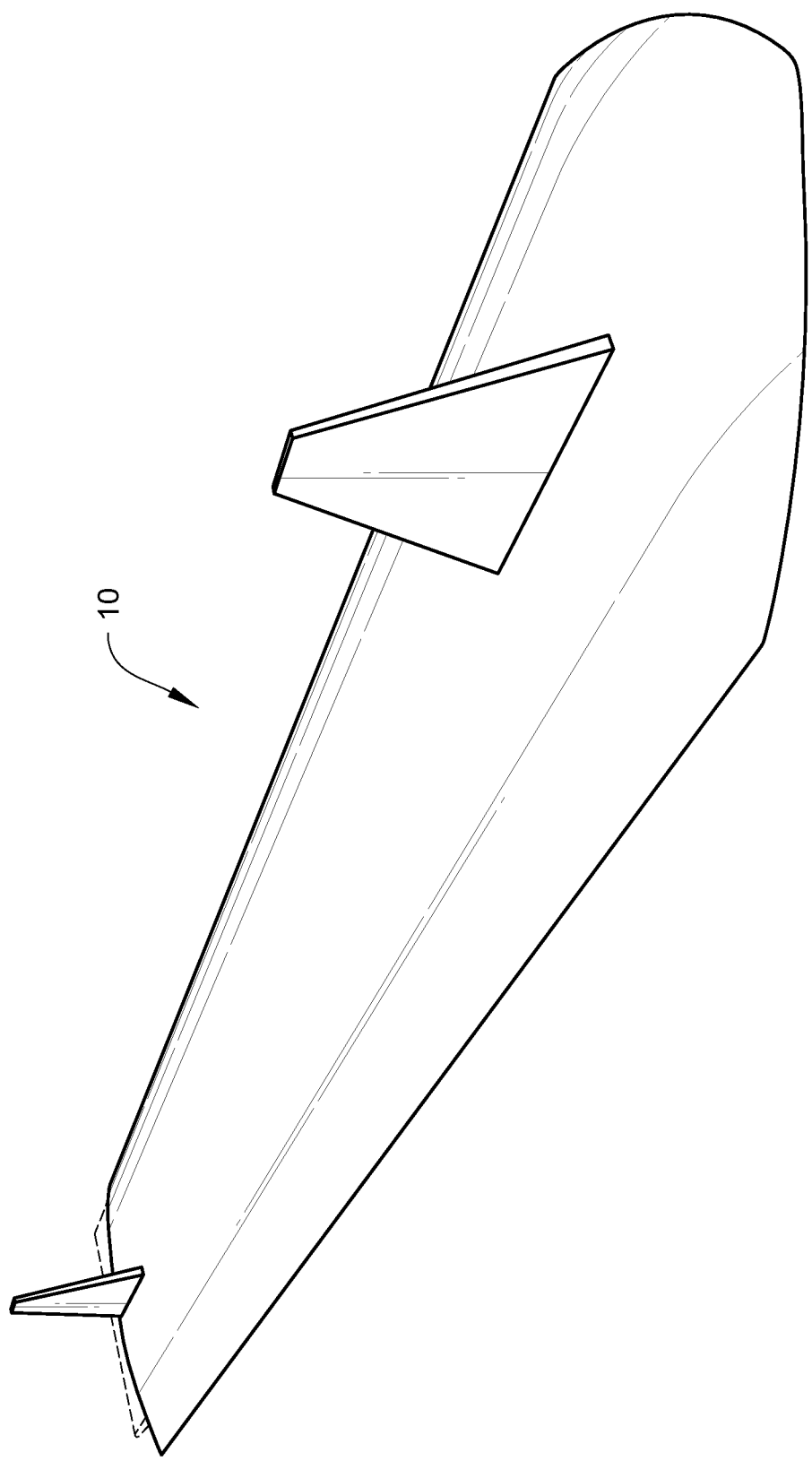
FIG. 12 is a perspective view of another embodiment of the OAW vehicle.
Figure 13:
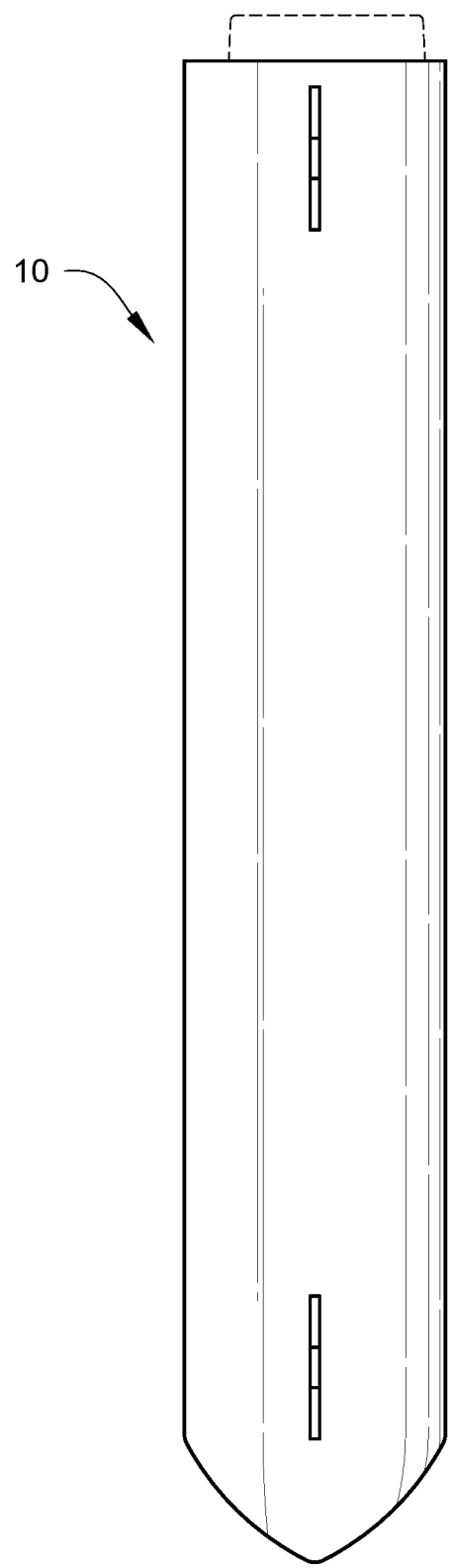
FIGS. 13 and 14 are top and bottom views, respectively, of the OAW vehicle of FIG. 12.
Figure 14:
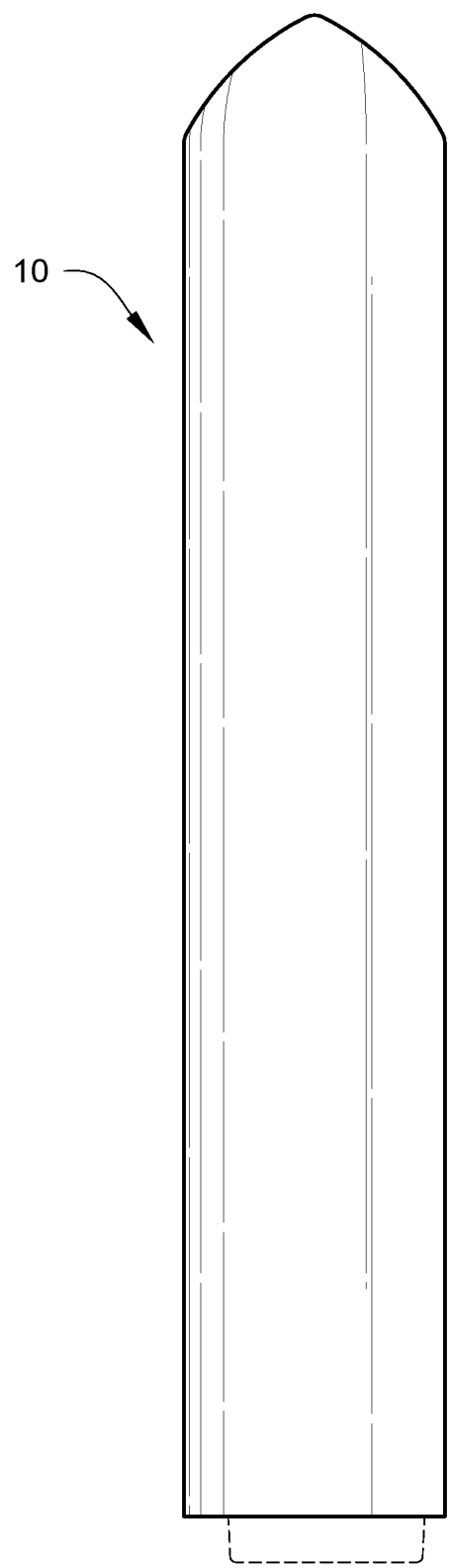
Figure 15:
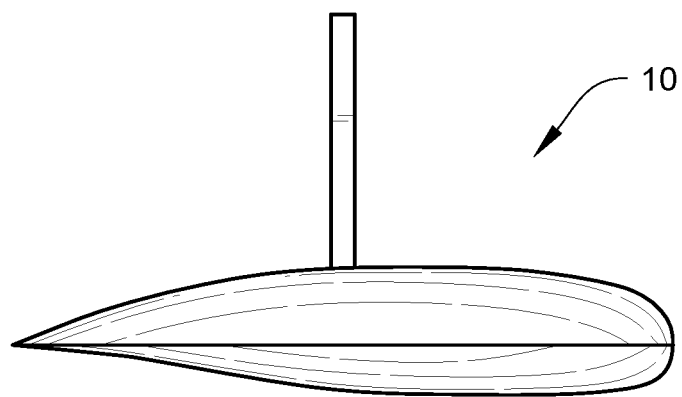
FIGS. 15 and 16 are right and left end views, respectively, of the OAW vehicle of FIG. 12.
Figure 16:
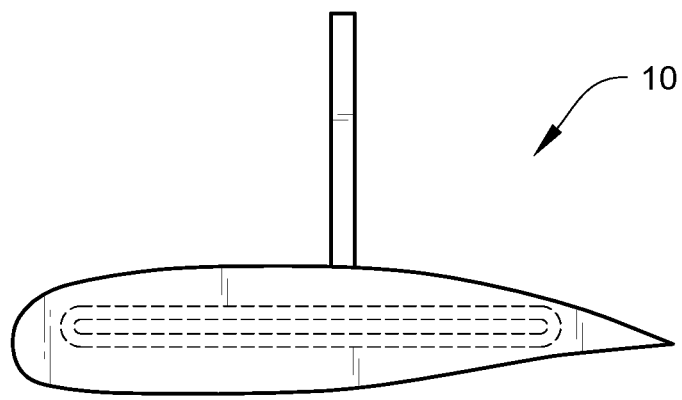
Figure 17:
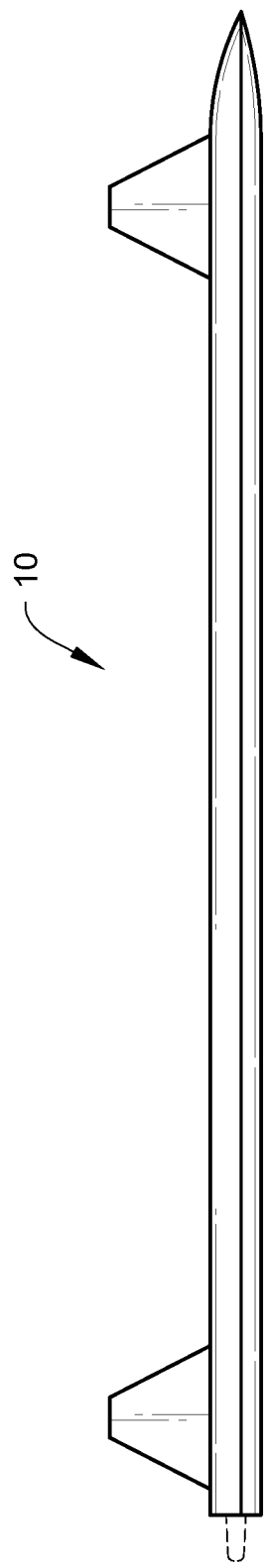
FIGS. 17 and 18 are a left side view and a right side view, respectively, of the OAW vehicle of FIG. 12.
Figure 18:
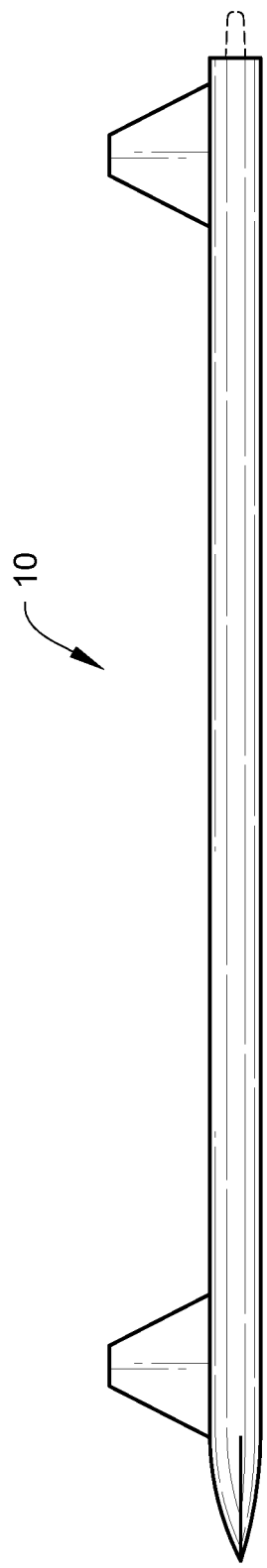

In some embodiments, referring to FIG. 11, the OAW vehicle 10 can have a flight trajectory that could be an orbital trajectory about the Earth. As part of the flight trajectory, in one embodiment the OAW vehicle 10 can be controlled to execute a skip-glide trajectory with at least one skip 68. Skip-glide may also be referred to as a boost-glide or skip reentry, and is a technique used to extend the range of the OAW vehicle 10 by employing aerodynamic lift in the high upper atmosphere. In some embodiments, the skip-glide trajectory can include two or more (i.e. a plurality) of the skips 68. The skip-glide trajectory can be executed prior to releasing the payload 12 from the OAW vehicle 10 or after releasing the payload 12 from the OAW vehicle 10.

The OAW vehicle 10 is controlled to ultimately land at a landing site on Earth while gliding. As the OAW vehicle 10 falls back to Earth, it can fly surfboard style, and then fly in an oblique orientation to its landing site. As the OAW vehicle 10 begins its descent (which may also be referred to as reentry), it is oriented in a longitudinal orientation with the longitudinal axis LA parallel to a direction of flight, and with the longitudinal end 26 forming a leading nose of the OAW vehicle 10. This may be referred to as "surfboard reentry" orientation. Assuming that the propulsion device 40 is the linear aerospike engine 42, the aerospike engine 42 becomes the leading edge/nose of the OAW vehicle 10 during descent/reentry. One benefit of this orientation is placing the center of mass of the OAW vehicle 10, mostly driven by the mass of the aerospike engine 42, ahead of the aerodynamic center for the return flight. Another benefit is that the more delicate parts of the OAW vehicle 10, such as the payload supports 14 and the control surfaces 34 will be on top of, and therefore in the aerodynamic shadow of, the OAW vehicle 10 during descent/reentry in order to afford maximum protection from the thermal environment during descent/reentry heating.

Figure 9:
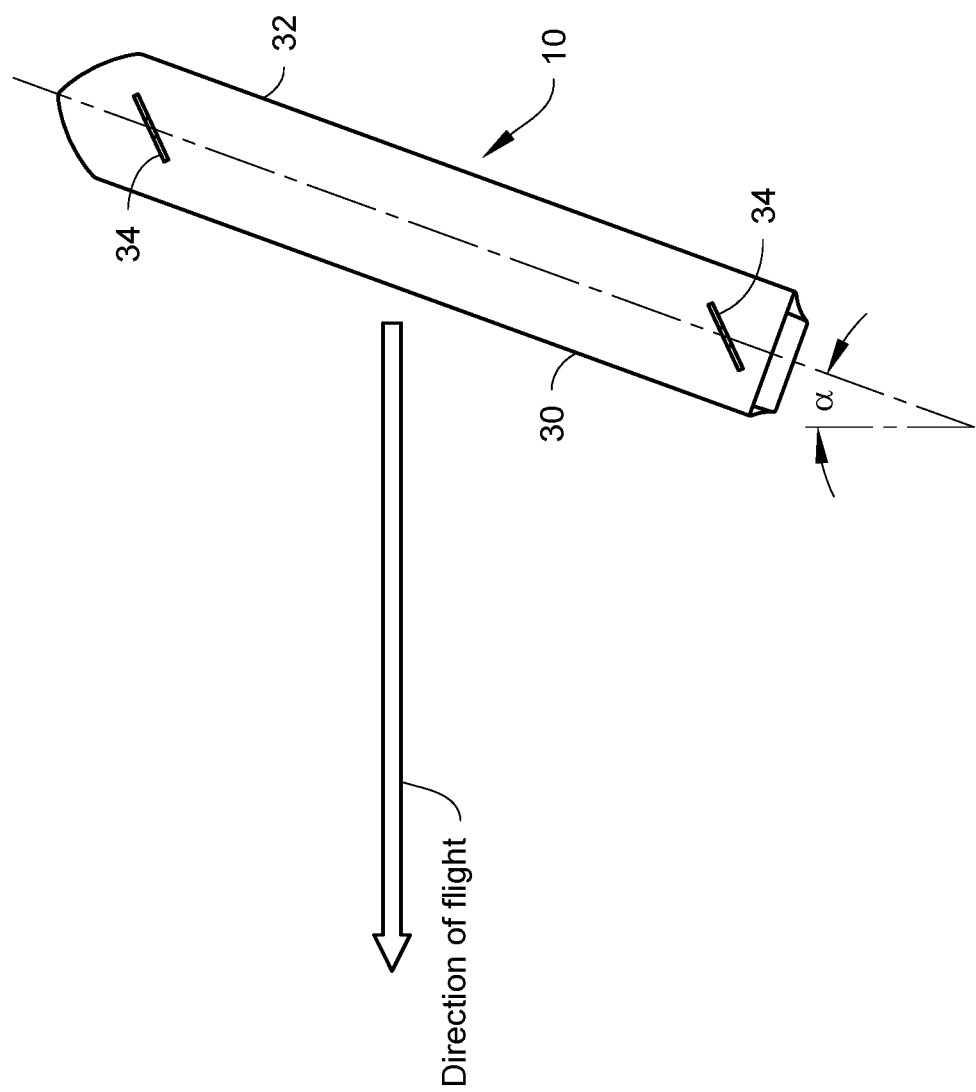
FIG. 9 is a top view of the OAW vehicle reoriented to an oblique orientation while gliding toward a landing site.

With reference to FIG. 9, once the OAW vehicle 10 has sufficiently decelerated, the OAW vehicle 10 is controlled, using the control surfaces 34, in order to reorient itself into an oblique orientation a as the OAW vehicle 10 continues its return flight path in the direction of flight back to the intended landing site. The oblique orientation a can be any angle suitable for allowing the OAW vehicle 10 to glide while continuing to decelerate. In one non-limiting example, the angle $\alpha$ can be about 40 degrees.

Figure 10:
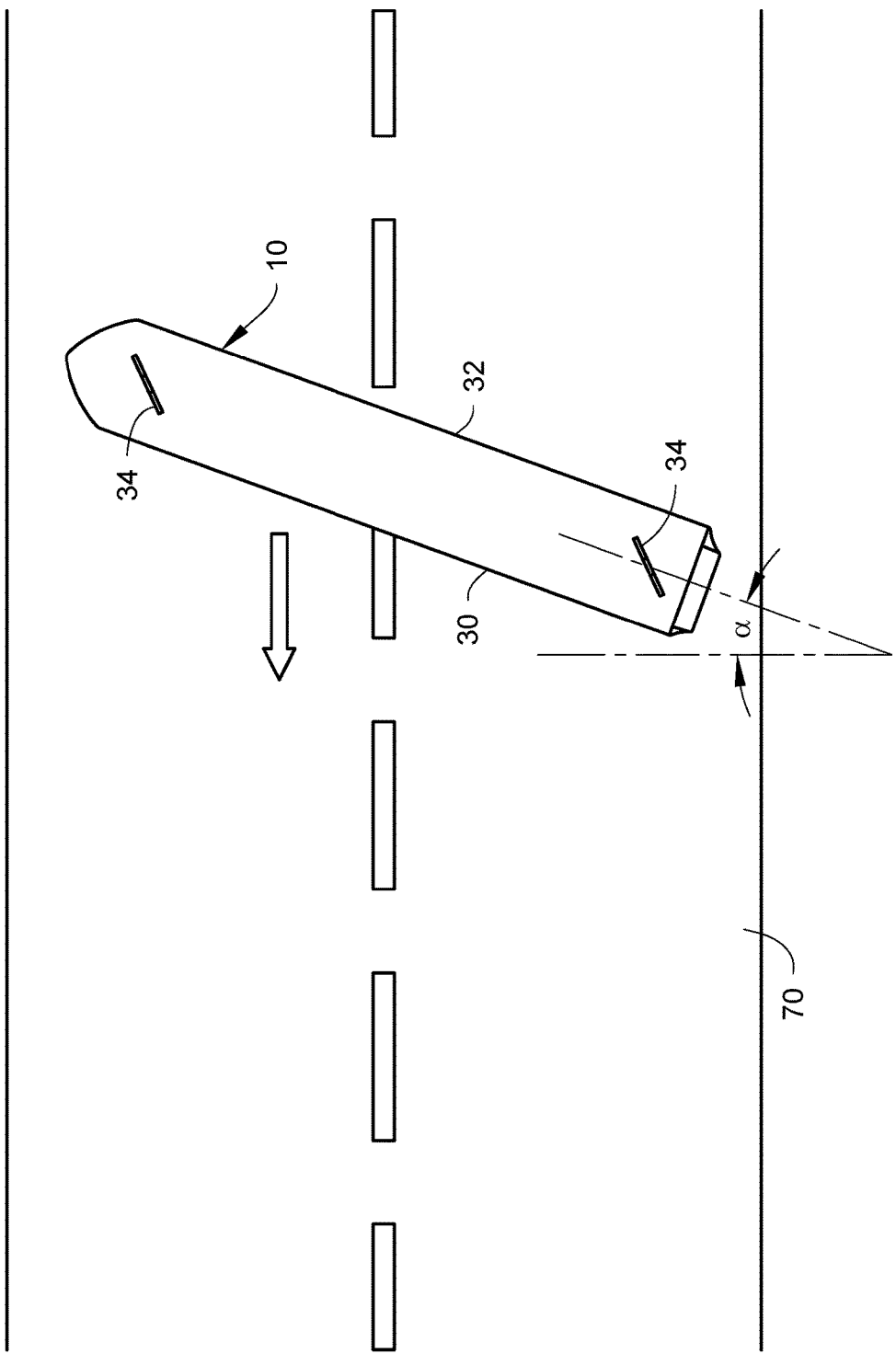
FIG. 10 is a top view of the OAW vehicle in an oblique orientation during landing on a runway at a landing site.

With reference to FIG. 10, the OAW vehicle 10 continues its gliding descent toward the landing site in an oblique orientation which can be the same as or different than in FIG. 9. The OAW vehicle 10 lands at the landing site while gliding in an oblique orientation. The landing site can include a runway 70. Prior to landing, the OAW vehicle 10 can deploy landing gear which can be internally stowed in conventional manner within the OAW vehicle 10.

In an embodiment, the OAW vehicle 10 can be carried by a glider to launch the OAW vehicle 10 at altitude. The OAW vehicle 10 can be carried by the glider with the longitudinal axis LA parallel to the direction of flight of the glider or in any other orientation. The glider is towed by a tow aircraft, and the glider may have one or more propulsion rockets for propelling the glider. The glider with the OAW vehicle 10 attached is towed to an altitude by the tow aircraft. The glider then lets loose of the tow line and, if the glider includes propulsion rocket(s), the glider carries the OAW vehicle 10 to a second altitude. When the glider reaches a suitable altitude, the OAW vehicle 10 is released from the glider. The OAW vehicle 10 will have some aerodynamic lift. It can fly its mission and then fly back to a landing strip in its oblique orientation. Alternatively, the OAW vehicle 10 can fly back to the tow aircraft and reconnect with the tow line to be towed back to its base, or fly back to the glider and reconnect to the glider. Once the base is reached, the OAW vehicle 10 can disconnect from the tow line or the glider and can then land as a glider.

Figure 20A:
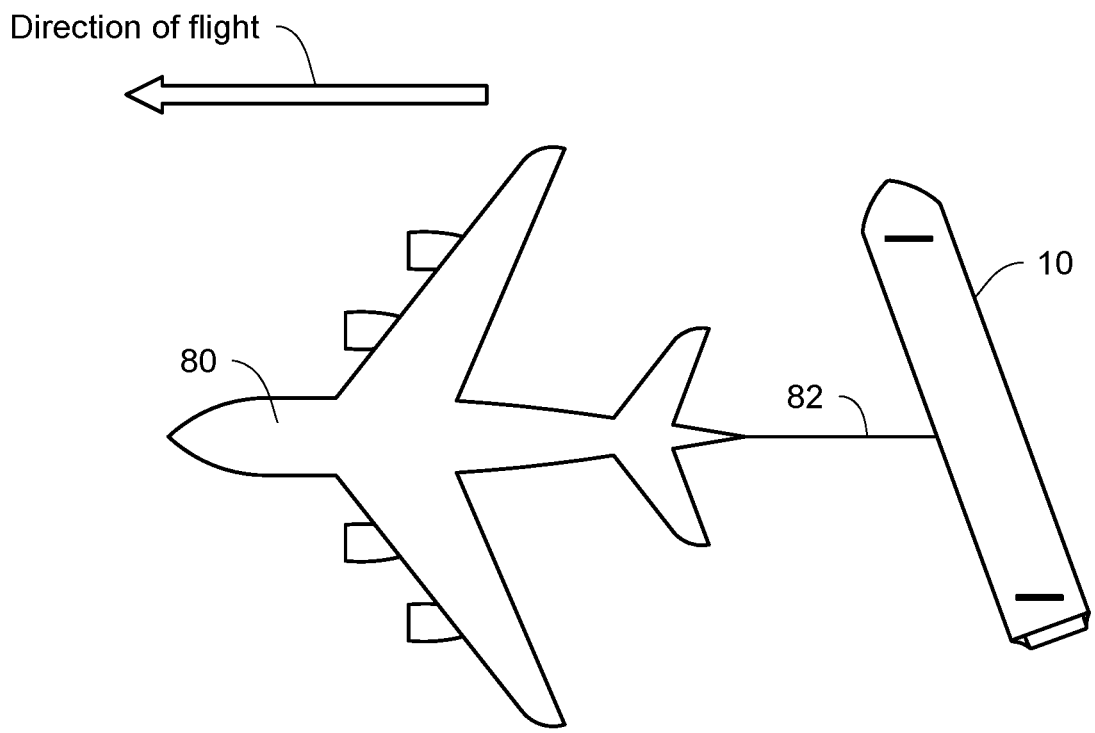
FIGS. 20A and 20B are top views of the OAW vehicle being towed by an aircraft with the OAW vehicle in an oblique orientation (FIG. 20A) and in an orientation perpendicular to the flight direction (FIG. 20B).
Figure 20B:
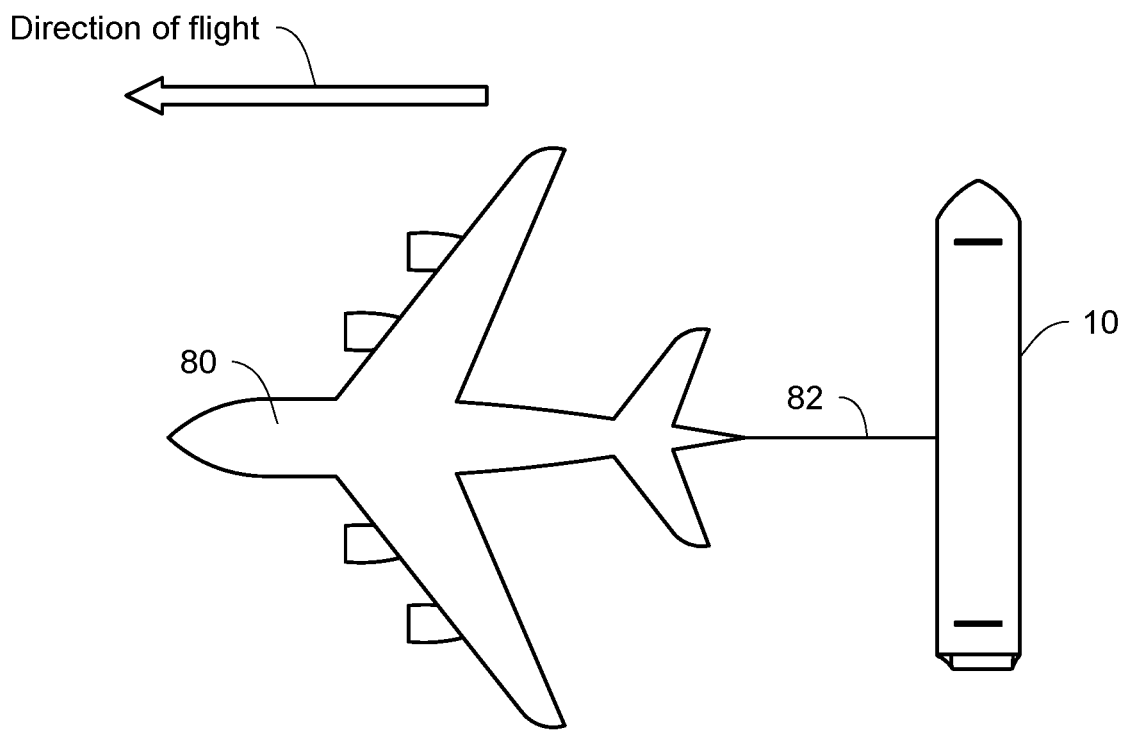

In another embodiment, referring to FIGS. 20A and 20B, the OAW vehicle 10 can be towed behind an aircraft 80 via a tow line 82. The aircraft 80 can be any aircraft that is suitable for towing the OAW vehicle 10. An example of a suitable aircraft is a C-17 Globemaster. The OAW vehicle 10 can have an internally mounted payload like in FIGS. 19A-B, or an externally mounted payload like in FIGS. 1A, 2 and 3, or no payload like in FIG. 1B. The aircraft 80 can launch with the OAW vehicle 10 in tow. The aircraft 80 and the OAW vehicle 10 can then proceed to a designated location and/or loiter for long periods of time with the OAW vehicle 10 in an oblique flight orientation (FIG. 20A) or with the OAW vehicle 10 flying perpendicular to the direction of flight (FIG. 20B).

FIGS. 12-18 illustrate another embodiment of the OAW vehicle 10. In this embodiment, the engine 40 is optional (and is depicted in broken lines). The OAW vehicle 10 is otherwise similar to the OAW vehicle of FIG. 1B including the control surfaces.

Additional embodiments can include the following.

Embodiment 1. A method described herein can include arranging an oblique all-wing vehicle into a vertical orientation with a longitudinal axis thereof arranged vertically; and launching the oblique all-wing vehicle while in the vertical orientation by igniting a rocket engine thereof.

Embodiment 2. The method of embodiment 1, further comprises: after launching the oblique all-wing vehicle, controlling the oblique all-wing vehicle to land at a landing site on Earth while gliding.

Embodiment 3. The method of embodiment 2, comprising controlling the oblique all-wing vehicle to initially descend in a longitudinal orientation with the longitudinal axis parallel to a direction of flight with a longitudinal end forming a leading nose of the oblique all-wing vehicle, followed thereafter by reorienting the oblique all-wing vehicle to an oblique orientation in which the oblique all-wing vehicle lands at the landing site while gliding.

Embodiment 4. The method of embodiment 1, comprising controlling the oblique all-wing vehicle to execute a skip-glide trajectory with at least one skip.

Embodiment 5. The method of embodiment 4, wherein the skip-glide trajectory comprises a plurality of skips.

Embodiment 6. A method of launching a payload described herein can include releasably mounting a payload onto an oblique all-wing vehicle having a longitudinal axis and a rocket engine at a longitudinal end of the oblique all-wing vehicle; arranging the oblique all-wing vehicle into a vertical orientation with the longitudinal end facing toward ground; launching the oblique all-wing vehicle while in the vertical orientation by igniting the rocket engine; and releasing the payload from the oblique all-wing vehicle after the oblique all-wing vehicle achieves a desired staging condition.

Embodiment 7. The method of embodiment 6, wherein the payload comprises a rocket engine, and further comprising: after releasing the payload from the oblique all-wing vehicle, controlling the rocket engine of the payload to ignite.

Embodiment 8. The method of embodiment 6, further comprising after releasing the payload from the oblique all-wing vehicle, controlling the oblique all-wing vehicle to land at a landing site on Earth while gliding.

Embodiment 9. The method of embodiment 8, comprising after releasing the payload from the oblique all-wing vehicle, controlling the oblique all-wing vehicle to initially descend in a longitudinal orientation with the longitudinal axis parallel to a direction of flight with the longitudinal end forming a leading nose of the oblique all-wing vehicle, followed thereafter by reorienting the oblique all-wing vehicle to an oblique orientation in which the oblique all-wing vehicle lands at the landing site while gliding.

Embodiment 10. The method of embodiment 6, comprising controlling the oblique all-wing vehicle to execute a skip-glide trajectory with at least one skip.

Embodiment 11. The method of embodiment 10, wherein the skip-glide trajectory comprises a plurality of skips.

Embodiment 12. The method of embodiment 10, wherein the skip-glide trajectory is executed prior to releasing the payload from the oblique all-wing vehicle or after releasing the payload from the oblique all-wing vehicle.

Embodiment 13. The method of embodiment 6, comprising mounting the payload onto the oblique all-wing vehicle while the oblique all-wing vehicle is in a horizontal orientation.

Embodiment 14. The method of embodiment 6, comprising mounting the payload onto an exterior surface of the oblique all-wing vehicle.

Embodiment 15. The method of embodiment 14, comprising mounting the payload onto the exterior surface of the oblique all-wing vehicle between a pair of adjustable control surfaces on the exterior surface.

Embodiment 16. The method of embodiment 6, wherein the oblique all-wing vehicle includes: an elongated airfoil body having a longitudinal axis, a top surface, a bottom surface, a first longitudinal end, a second longitudinal end, a first longitudinal edge at a first juncture between the top surface and the bottom surface that extends from the first longitudinal end to the second longitudinal end, and a second longitudinal edge at a second juncture between the top surface and the bottom surface that extends from the first longitudinal end to the second longitudinal end; the elongated airfoil body having an airfoil-shaped cross-section, with the first longitudinal edge defining a leading edge of the elongated airfoil body and the second longitudinal edge defining a trailing edge of the elongated airfoil body; and further comprising: the rocket engine is mounted to the elongated airfoil body at the first longitudinal end; and the exterior surface is the top surface.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of operating an oblique all-wing vehicle, comprising:
    arranging the oblique all-wing vehicle into a vertical orientation with a longitudinal axis thereof arranged vertically and a rocket engine at a longitudinal end thereof facing vertically downward;
    launching the oblique all-wing vehicle while in the vertical orientation by igniting the rocket engine for an ascent period and thereafter terminating thrust of the rocket engine;
    as the oblique all-wing vehicle descends back toward Earth, orienting the oblique all-wing vehicle so that the rocket engine forms a leading nose of the oblique all-wing vehicle for a descent period;
    after the descent period, reorienting the oblique all-wing vehicle into an oblique orientation as the oblique all-wing vehicle glides to a landing.

2. The method of claim 1, wherein the ascent period continues until the oblique all-wing vehicle exits the Earth's atmosphere.

3. The method of claim 1, further comprising: after launching and prior to the descent period, releasing a payload from the oblique all-wing vehicle once the oblique all-wing vehicle reaches a desired staging condition.

* * * * *